United States Patent [19]

Urda, Paul

[11] Patent Number: 5,183,441
[45] Date of Patent: Feb. 2, 1993

[54] BELT SANDER TENSIONER

[75] Inventor: Urda, Paul, South Waverly, Pa.

[73] Assignee: Ingersoll-Rand Company, Woodcliff Lake, N.J.

[21] Appl. No.: 829,827

[22] Filed: Feb. 3, 1992

[51] Int. Cl.$^5$ ............................................. F16H 7/08
[52] U.S. Cl. ................................... 474/138; 474/117
[58] Field of Search ............... 474/101, 109, 111, 113, 474/117, 133, 135, 136, 138

[56] References Cited

U.S. PATENT DOCUMENTS 4,969,859 11/1990 Holbrook ............................. 474/138
5,030,173 7/1991 Bryant ............................. 474/117 X Primary Examiner—Thuy M. Bui
Attorney, Agent, or Firm—Walter C. Vliet

[57] ABSTRACT

A belt tensioning device for a belt sander is disclosed in the form of a guided U shaped saddle permitting economies in manufacture associated with external milling of the cantilever extension bar of a small belt sander for use with handheld power tools.

9 Claims, 2 Drawing Sheets

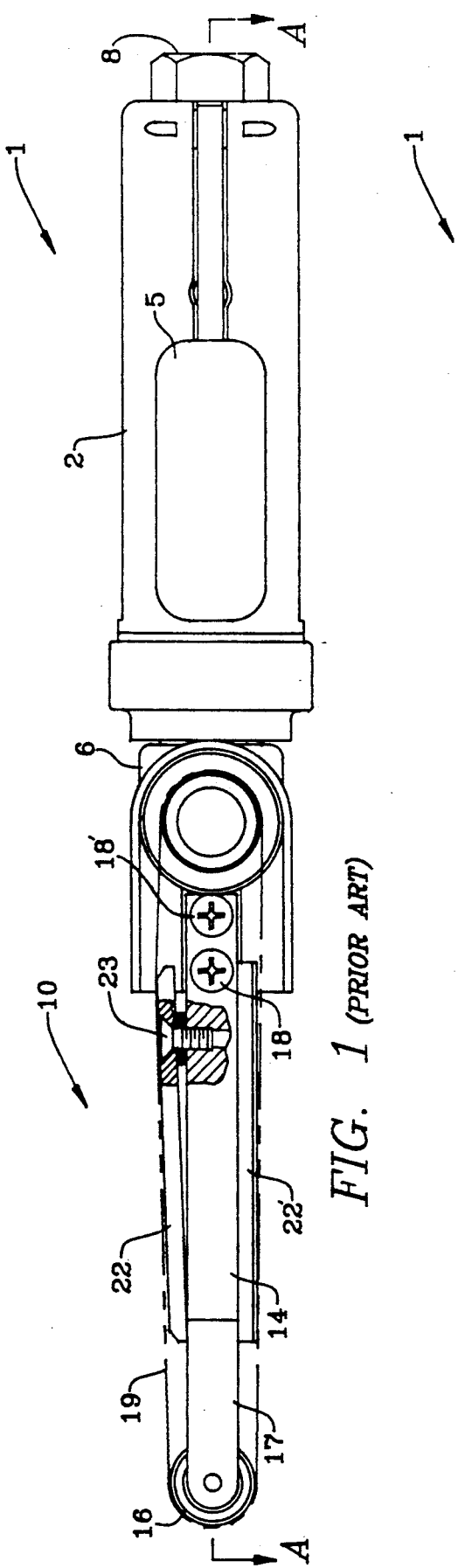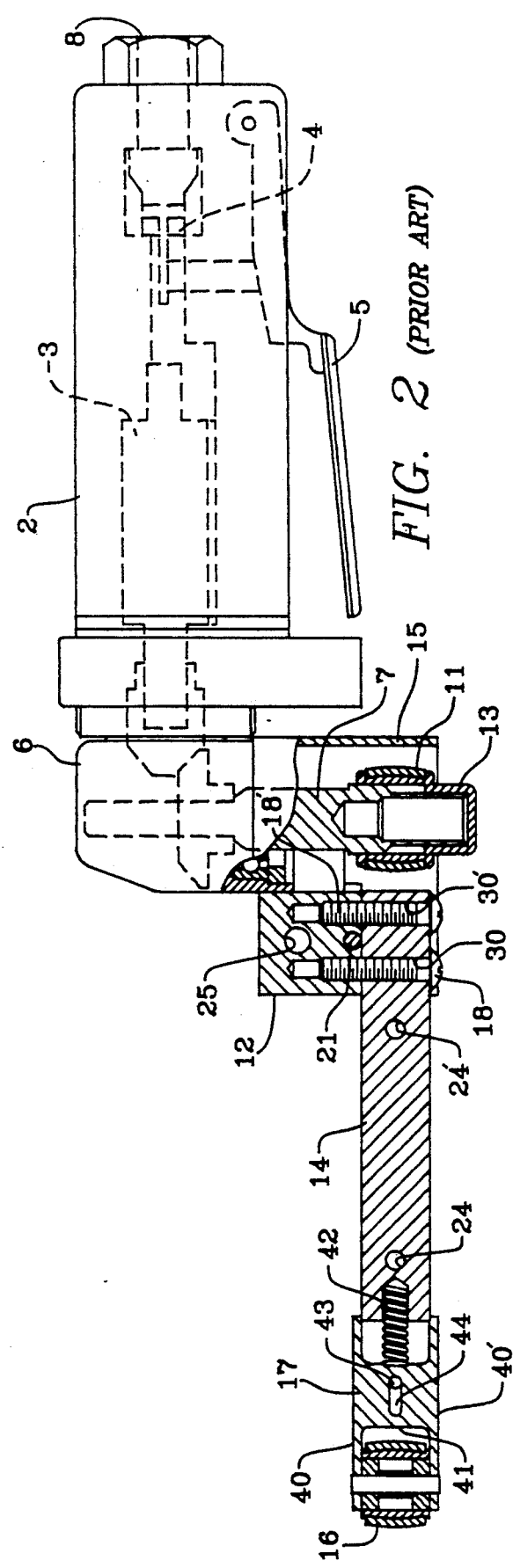

BELT SANDER TENSIONER

BACKGROUND OF THE INVENTION

This invention relates generally to sanding belt tensioning devices and more particularly to a spring tension device for a mini belt sander attachment for a handheld power tool.

In similar prior art devices the design of the tensioning yoke required that the yoke be constructed from a cast or machined part which cooperated with a bifurcated clevis having a counterbore for retaining the compression spring. The bifurcation and counterbore substantially reduced the critical tip strength of the clevis and the assembly required close machined tolerances for adequate performance.

The foregoing illustrates limitations known to exist in present mini belt sander art. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a belt sander tensioning device for a belt sander or the like comprising an elongate cantilever bar having a recessed pocket formed on its surface towards its one unsupported end; a substantially "U" shaped saddle in axial sliding cooperation with the cantilever bar and substantially enclosing the recessed pocket; the "U" shaped saddle being further provided with a tab projecting into the recessed pocket; and a spring means interspersed between the tab and the recessed pocket for resiliently biasing the "U" shaped saddle in one axial direction along the cantilever bar.

The foregoing and other aspects will become apparent from the following detailed description of the invention when considered in conjunction wit the accompanying drawing figures.

BRIEF DESCRIPTION OF THE DRAWING FIGURES

FIG. 1 is a side view illustrating a mini belt sander adapted to a handheld power tool generally according to the prior art;

FIG. 2 is a plan cross sectional view of the mini handheld sander according to the prior art taken about section A—A of FIG. 1;

DETAILED DESCRIPTION

Figure 3:
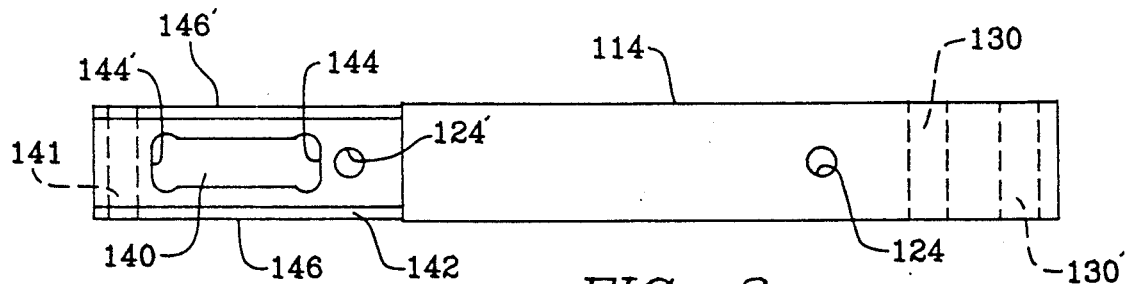
FIG. 3 is a top plan view of a new elongate cantilever bar illustrating an embodiment of the belt tensioning device of this invention.

Referring to FIG. 1 a mini belt sander for attachment to a handheld power tool according to the prior art is shown generally by reference numeral 1. The power tool comprises a motor housing 2 connected to an angle drive 6 to which is mounted a belt sanding device generally indicated by reference numeral 10.

As best seen in FIG. 2, a pneumatic driven handheld power tool receives pressure fluid through an air inlet 8 which passes the pressure fluid to a valve assembly 4 operated by a throttle lever 5. Air passing through the valve assembly is admitted to an air motor 3 having its power output delivered to an angle drive 6 having its power output on output spindle 7. Attached to output spindle 7 is a spindle mounting cap 13 having on its peripheral surface a belt drive roller 11 which is essentially a crowned driving roller for the continuous flexible sanding belt 19 (best seen in FIG. 1).

According to the prior art an integral mounting clamp 12 with guard 15 is attached to the angle drive housing by compressive cooperative relationship accomplished by a clamping screw (not shown) which is inserted in guard clamping screw hole 25. Tightening the screw serves to reduce the circumference and hence the diameter of the mounting clamp 12 about the angle drive housing 6 to cause a clamping fit and retention of the mounting/clamping guard on the housing.

A clevis bar 14 is shown mounted to the mounting clamp by means of two mounting and tracking screws 18 and 18'. A tracking pin 21 is provided between the mounting clamp 12 and the clevis bar 14. The pin 21 permits angular displacement between the mounting clamp and the clevis bar as a means of adjusting belt tracking between the belt drive roller 11 and an idler roller 16 mounted on a yoke 17 at the unsupported end of the clevis 14.

According to the prior art, yoke 17 is inserted in the bifurcated clevis end. The yoke has essentially two side rails 40, 40' joined by a central web 41 at essentially the centerline of the clevis which cooperate with the bifurcated slot forming the clevis to guide the yoke in axial extension from the clevis 14. Axial extension and therefore belt tension is promoted by a spring 42 which is inserted in an axial bore in the clevis and cooperates between the clevis and the yoke in compression.

A retaining pin 43 cooperating with an elongate slot 44 in the yoke limits the yoke extension and retains its assembly. The length of the sanding belt 19 is selected such that in normal operation the yoke is displaced axially to the right as shown in FIG. 2 against the compression of tensioning spring 42. The resulting compression of the tension spring provides the required belt tension to allow the belt to be driven by the belt drive roller 11 and to retain the belt on the crowned belt drive roller 11 and idler roller 16 as is understood in the prior art. Tracking of the belt is controlled by selectively orienting the clevis about the tracking pivot pin 21 by means of selecting appropriate draw on tensioning screws 18 and 18'.

Two backing plate holes 24, 24' are provided for mounting backing plate 22 by means of backing plate screws 23, 23' (not shown). Flexible back up pad 22' is adhesively retained. Bores 30, 30' are provided to receive the tracking screws 18, 18' (as best seen on FIG. 1).

The construction of the prior art yoke tensioning device requires complicated machining of both the yoke and the clevis to assure proper sliding fit. This is necessary to assure belt tracking which requires close tolerance support for the yoke. In addition, the counterbore for the tensioning spring 42 required a separate manufacturing operation and resulted in a weakened tip structure. Assembly was further complicated by need to insert the retaining pin 43 into a blind slot wherein slight variations of manufacture could result in binding of the tensioning device.

Accordingly, the cantilever bar and yoke of the present invention has been invented to address the difficulties of the prior art. The cantilever bar according to the present invention is similar to the clevis bar of the prior invention at its supporting end. However, at the unsupported end, the clevis has been removed and replaced by a dog bone recess 140, best seen in FIGS. 3 and 4 The dog bone recess extends only partly through the cantilever bar thereby providing a stronger structure. Dependent on method of manufacture the dog bone shape may be replaced with a rectangular shape with sharper corner radii.

A milled surface 145 is provided on the top of the cantilever bar and milled surfaces 146 and 146' have been provided (see FIGS. 1 and 2) in the preferred embodiment to promote an accurate sliding surface but may be omitted in cases where the surface of the cantilever bar is of sufficient quality to assure linear tracking of the yoke without binding. A radius break 142 is provided to accommodate the radiused stamping structure of the yoke and may also be omitted if the yoke is stamped with minimal internal radius.

Figure 4:
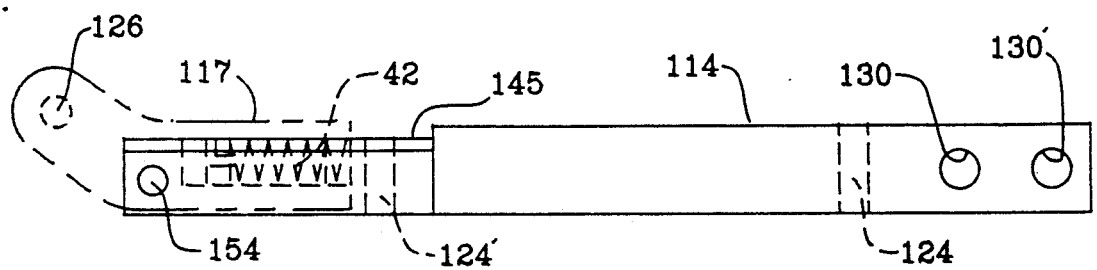
FIG. 4 is a side elevation of a new elongate cantilever bar according to the present invention.

A cross bore mounting pin hole 141 is provided to retain the yoke 117 (shown mounted in phantom on the cantilever bar in FIG. 4). Two backing plate holes 124, 124' are provided as with the case of the prior art for mounting the backing plate 22 by means of backing plate mounting screws 23, 23' (not shown) as best seen on FIG. 1. Bores 130 and 130' are provided to receive the tracking screws 18, 18'.

Figure 5:
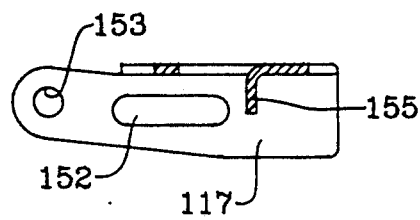
FIG. 5 is a partially sectioned side elevation of a new yoke for the present invention.
Figure 6:
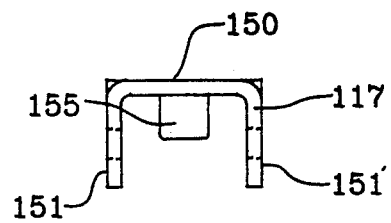
FIG. 6 is an end view of the new yoke according to the present invention.
Figure 7:
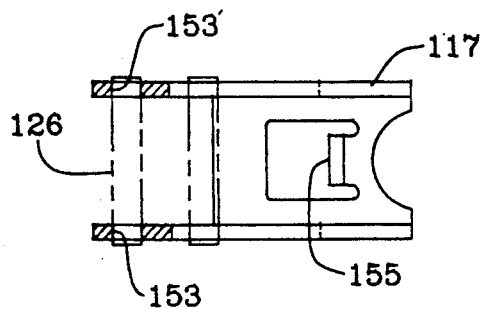
FIG. 7 is a partially sectioned bottom plan view of the yoke of the present invention.

The yoke according to the present invention is best seen in FIGS. 5-7. It may be manufactured from a stamping. The yoke has a top crown 150 and two side flanges 151, 151' which cooperate respectively with the top of the cantilever bar and the sides of the cantilever bar to track the yoke relative to the bar in axial extension. The yoke 117 is further provided with two pin bores 153, 153' in the extension of the side flanges which hold the idler roller (best seen in FIG. 7). The pin bores 153, 153' receive an idler roller pin 126 which mounts the idler roller (not shown).

Each of the side flanges 151 and 151' is provided with an elongated guide slot 152 for receiving a mounting pin. The pin 154, shown in phantom in FIG. 7, is inserted in mounting pin hole 141 and extends from both side faces of the cantilever bar to intercept the guide slot providing a means of retaining the yoke o the cantilever bar while allowing it restricted axial traverse. The yoke is further provided with a bent tang 155 extending from the top crown and downward therefrom (as best seen in FIGS. 5 and 6.). The bent tang protrudes into the bone shaped recess 140 forming a sliding petition therein. A compression spring 42 is inserted between the tang 155 and one end of the recess 140 for providing cooperative extending force between the bent tang 155 and the innermost end 144 of the bone recess 140. Axial extension of the yoke is limited by both the mounting pin and alternatively the bent tab cooperating with the outermost end surface 144' of the bone recess 140.

As may be appreciated by one skilled in the art external milling of the cantilever bar is more readily accomplished than the internal/external milling required in the prior art. In addition, three-dimensional milling of the yoke is avoided to achieve the required tolerance.

As may now also be appreciated by one skilled in the art the spring 42 provides the tensioning of the sanding belt. We have described a new tensioning device and means of economical manufacture for the tensioning device.

Having described the invention, what is claimed is:

1. A belt tensioning device for belt sander or the like comprising:
   an elongate cantilever bar having a recessed pocket formed on its surface towards its one end;
   a substantially "U" shaped saddle in axial sliding cooperation with said cantilever bar and substantially enclosing said recessed pocket;
   said "U" shaped saddle being further provided with a tab projecting into said recessed pocket; and
   a spring means interspersed between said tab and said recessed pocket for resiliently biasing said "U" shaped saddle in one axial direction along said cantilever bar.

2. A belt tensioning device according to claim 1, wherein said elongate cantilever bar is provided with a means for mounting said elongate cantilever bar to a driver.

3. A belt tensioning device according to claim 2, wherein said means for mounting further comprises means for adjusting belt tracking.

4. A belt tensioning device according to claim 1, wherein said recessed pocket extends only partly through said cantilever bar to a depth sufficient to receive a spring.

5. A belt tensioning device according to claim 4, wherein said recessed pocket is dog bone shaped to provide substantially flat ends for a spring bearing surface.

6. A belt tensioning device according to claim 1, wherein said "U" shaped saddle further comprises an accurately formed saddle of defined internal dimensions and said saddle cooperates with accurately formed external surfaces of said cantilever bar to form accurate linear guide for said saddle for linear traverse of said saddle along said bar.

7. A belt tensioning device according to claim 6, wherein said saddle is provided with means for retaining said saddle on said bar.

8. A belt tensioning device according to claim 7, wherein said means for retaining said saddle further comprises a pin interspersed through a bore in said bar and cooperating accurate slot means on said saddle.

9. A belt tensioning device according to claim 1, wherein said spring means further comprises a compression spring.

* * * * *